(12) United States Patent
Yang

(10) Patent No.: US 9,430,221 B2
(45) Date of Patent: Aug. 30, 2016

(54) DEVICE AND METHOD FOR UPDATING FIRMWARE OF A RACKMOUNT SERVER SYSTEM

(71) Applicants: INVENTEC (PUDONG) TECHNOLOGY CORPORATION, Shanghai (CN); INVENTEC CORPORATION, Taipei (TW)

(72) Inventor: Hao-Rui Yang, Shanghai (CN)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 11 days.

(21) Appl. No.: 14/518,668

(22) Filed: Oct. 20, 2014

(65) Prior Publication Data

US 2016/0026459 A1    Jan. 28, 2016

(30) Foreign Application Priority Data

Jul. 24, 2014 (CN) .......................... 2014 1 0356833

(51) Int. Cl.
*G06F 9/445* (2006.01)
*H04L 29/08* (2006.01)

(52) U.S. Cl.
CPC ............... *G06F 8/665* (2013.01); *H04L 67/06* (2013.01)

(58) Field of Classification Search
None
See application file for complete search history.

(56) References Cited

U.S. PATENT DOCUMENTS

| | | | | |
|---|---|---|---|---|
| 2002/0114384 A1* | 8/2002 | Nelson | ...................... | G06F 8/65 375/222 |
| 2004/0030766 A1* | 2/2004 | Witkowski | ............ | H04L 41/082 709/223 |
| 2011/0078435 A1* | 3/2011 | Krieger | ...................... | G06F 1/26 713/100 |
| 2012/0173605 A1* | 7/2012 | Shuster | .................. | G06F 9/5072 709/202 |
| 2013/0111455 A1* | 5/2013 | Li | .......................... | G06F 21/572 717/169 |
| 2014/0137095 A1* | 5/2014 | Chiu | ....................... | G06F 8/665 717/171 |

\* cited by examiner

*Primary Examiner* — Daxin Wu
(74) *Attorney, Agent, or Firm* — Kirton McConkie; Evan R. Witt

(57) ABSTRACT

A method for updating firmware of a rackmount server system is disclosed herein and is suited to update a firmware of an update-needed chip module by a control chip module. The method includes the following steps of: sending a plurality of packets constituting a renewed firmware to the update-needed chip module by the control chip module; sending a command of verifying the plurality of packets to the update-needed chip module by the control chip module; acquiring a plurality of verification messages, corresponding to the plurality of packets, from the update-needed chip module by the control chip module; and determining whether all of the plurality of verification messages corresponding to the plurality of packets are correct or not by the control chip module, thereby making sure whether the plurality of packets received by the update-needed chip module are incorrect or not.

7 Claims, 5 Drawing Sheets

DEVICE AND METHOD FOR UPDATING FIRMWARE OF A RACKMOUNT SERVER SYSTEM

TECHNICAL FIELD OF THE INVENTION

The present invention relates to a server structure field, and in particular to a method for updating firmware of a rackmount server system and a device thereof which are suited to update a firmware of an update-needed chip module by a control chip module.

BACKGROUND OF THE INVENTION

At present, servers are widely used in various enterprises. In addition to application programs in international networks and telecommunication services, the scope of development thereof also includes application programs which are more involved the lives of ordinary people, such as finance, economics, internet banks, etc., all of which must rely on the powerful computing capabilities of the server.

Nowadays, there are many types of servers, and more common servers include rackmount servers and tower servers. The rackmount server herein is a tower server to optimize the structure, and the designed purpose thereof is primarily to minimize the space occupied by the server. In general, the width of a rackmount server is 19 inches, and height is in units of U (1U=44.45 mm). Typically, a rackmount server has its own standards of 1U, 2U, 4U, 5U, and so on. In order to enhance the application program of a baseboard of the current server, system vendors usually design the baseboard of the server to be in conformity with all types (such as 1U, 2U, and 4U) of systems.

A motherboard in the rackmount server system includes a variety of embedded chips (for example, controller chips; Cortex-M3 or Cortex-4 chips of power computing chips). These embedded chips require a firmware to coordinate their operation. If the firmware of the above-mentioned chips requires updating after the background server system has been shipped. The update can be performed by a Rack Management Controller (referred to as RMC) which is disposed in the server rack. The rack management controller includes an ARM9 chip and runs on an embedded Linux system. When the firmware of the embedded chips on a certain motherboard of the rackmount server system needs to be updated, the rack management controller reads a firmware file and decomposes the firmware file into a plurality of packets for sending to an update-needed chip. In a conventional update method, when a packet is sent, the rack management controller will wait for the return of the chip, and check whether the packet CRC is correct. The next packet will be sent only if the CRC is correct. Consequently, at present, a firmware update is relatively slow and takes a longer time.

Accordingly, there is an urgent need to provide a new method or device for updating the firmware of the rackmount server system so as to solve the above-mentioned problem.

SUMMARY OF THE INVENTION

An objective of the present invention is to provide a method for updating a firmware of a rackmount server system, which can effectively solve the problem of a slow and time-consuming firmware update in the prior art, thereby saving the time spent on the update, and making a firmware updating speed increase dramatically.

To achieve the foregoing objectives, according to an aspect of the present invention, a method for updating firmware of a rackmount server system is provided, suited to update a firmware of an update-needed chip module by a control chip module. The control chip module is a rack management controller of the rackmount server system. The rackmount server system includes at least one server coupled to the rack management controller, and the at least one server includes the update-needed chip module. The rack management controller is capable of controlling a start-up and a shutdown of the at least one server. The method includes the steps of: sending a plurality of packets constituting a renewed firmware to the update-needed chip module by the control chip module; sending a command of verifying the packets to the update-needed chip module by the control chip module; acquiring a plurality of verification messages corresponding to the packets from the update-needed chip module by the control chip module; and determining whether all of the verification messages corresponding to the packets are correct or not by the control chip module, thereby making sure whether the packets received by the update-needed chip module are incorrect or not.

In an alternative embodiment, the step of determining whether all of the verification messages corresponding to the packets are correct or not by the control chip module includes: if one of the verification messages is incorrect, further comprising the following steps: step a, resending the packet corresponding to the wrong verification messages to the update-needed chip module by the control chip module; step b, re-acquiring the verification message corresponding to the packet, which is resent to the update-needed chip module, from the update-needed chip module by the control chip module; step c, determining whether the verification message corresponding to the packet, which is resent to the update-needed chip module, is correct or not by the control chip module; if correct, the packet which is resent to the update-needed chip module by the control chip module is correct; if incorrect, executing the steps a, b, and c in loops until there are no wrong verification messages in the verification messages acquired by the control chip module from the update-needed chip module.

In an alternative embodiment, before the step of sending a plurality of packets constituting a renewed firmware to the update-needed chip module by the control chip module, the method further includes resolving the renewed firmware into the packets by the control chip module.

In an alternative embodiment, the step of determining whether all of the verification messages corresponding to the packets are correct or not by the control chip module includes: if the verification messages are correct, each of the packets received by the update-needed chip module is correct.

In an alternate embodiment, the update-needed chip module is a chip having a firmware, and the chip having the firmware is disposed on a motherboard of a server.

In an alternative embodiment, before the step of sending a plurality of packets constituting a renewed firmware to the update-needed chip module by the control chip module, the method further includes: sending an update-beginning command to the update-needed chip module by the control chip module; acquiring an operating status message from the update-needed chip module by the control chip module; determining whether the operating status message is a first operating status by the control chip module. If not, then the update-needed chip module is switched to the first operating status.

In an alternative embodiment, after the step of sending the update-beginning command to the update-needed chip module by the control chip module, the method further includes: waiting to receive an operating status message from the update-needed chip module by the control chip module; if a waiting time of the reception exceeds a predetermined first time threshold value, resending an update-beginning command to the update-needed chip module by the control chip module, and recording a number of the update-beginning command which are sent.

In an alternative embodiment, after the step of resending an update-beginning command to the update-needed chip module by the control chip module and recording a number of the update-beginning command which are sent, the method further includes: determining whether the number of the update-beginning command which are sent is greater than a predetermined maximum resending number by the control chip module; If so, then stopping the firmware update.

In an alternative embodiment, after the step of no wrong verification messages in the verification messages acquired by the control chip module from the update-needed chip module, the method further includes: sending a command of completing the firmware update to the update-needed chip module by the control chip module; acquiring a response of completing the firmware update from the update-needed chip module by the control chip module, wherein the update-needed chip module has been marked as a firmware update success state.

Another objective of the present invention is to provide a firmware update device suited to update a firmware of an update-needed chip module by a control chip module. The control chip module is a rack management controller of a rackmount server system. The rackmount server system includes at least one server coupled to the rack management controller, and the at least one server includes the update-needed chip module. The rack management controller is capable of controlling a start-up and a shutdown of the at least one server. The firmware update device includes: a packet sending module utilized to send a plurality of packets constituting a renewed firmware to the update-needed chip module by the control chip module; a verification message request module coupled to the packet sending module, utilized to send a command of verifying the packets to the update-needed chip module by the control chip module; a verification message capture module coupled to the verification message request module, utilized to acquire a plurality of verification messages corresponding to the packets from the update-needed chip module by the control chip module; and verification message determining module coupled to the verification message capture module, utilize to determine whether all of the verification messages corresponding to the packets are correct or not by the control chip module, thereby making sure whether the packets received by the update-needed chip module are incorrect or not.

In an alternative embodiment, the firmware update device further includes: a packet resending module coupled to the verification message determining module, utilized to resend the packet corresponding to the wrong verification messages to the update-needed chip module by the control chip module if one of the verification messages is incorrect; a verification message recapture module coupled to the packet resending module, utilized to re-acquire the verification message corresponding to the packet, which is resent to the update-needed chip module, from the update-needed chip module by the control chip module; a verification message predetermining module coupled to the verification message recapture module, utilized to determine whether the verification message corresponding to the packet, which is resent to the update-needed chip module, is correct or not by the control chip module, and when the verification message is incorrect, to call the packet resending module.

In an alternative embodiment, the update-needed chip module is a chip having a firmware, and the chip having the firmware is disposed on a motherboard of a server.

In an alternative embodiment, the firmware update device further includes: an update-beginning command sending module, utilized to send an update-beginning command to the update-needed chip module by the control chip module; an operating status capture module coupled to the update-beginning command sending module, utilized to acquire an operating status message from the update-needed chip module by the control chip module; an operating status determining module coupled to the operating status capture module, utilized to determine whether the operating status message is a first operating status by the control chip module, if not, then the update-needed chip module being switched to the first operating status.

In an alternative embodiment, the firmware update device further includes: a waiting receipt module utilized to wait to receive an operating status message from the update-needed chip module by the control chip module; an update-beginning command resending module coupled to the waiting receipt module, utilized to make the control chip module to resend an update-beginning command to the update-needed chip module if a waiting time of the reception exceeds a predetermined first time threshold value, and record a number of the update-beginning command which are sent.

In an alternative embodiment, the firmware update device further includes: a resending number determining module utilized to determine whether the number of the update-beginning command which are sent is greater than a predetermined maximum resending number by the control chip module, if so, then stopping the firmware update.

In an alternative embodiment, the firmware update device further includes: a completing update request module utilized to send a command of completing the firmware update to the update-needed chip module by the control chip module; a completing update response module coupled to the completing update request module, utilized to acquire a response of completing the firmware update from the update-needed chip module by the control chip module, wherein the update-needed chip module has been marked as a firmware update success state.

The advantages of the present invention are that by the method and the device for updating the firmware of the rackmount server system, the problem of slow and time-consuming firmware updates in the prior art can be effectively solved, thereby saving a lot of time on the update and making a firmware updating speed increase dramatically, so as to further improve the efficiency of the update.

DETAILED DESCRIPTION OF THE INVENTION

The method for updating firmware of rackmount server system according to the preferred embodiment of the invention will be described in detail accompanied by the drawings.

Figure 1:
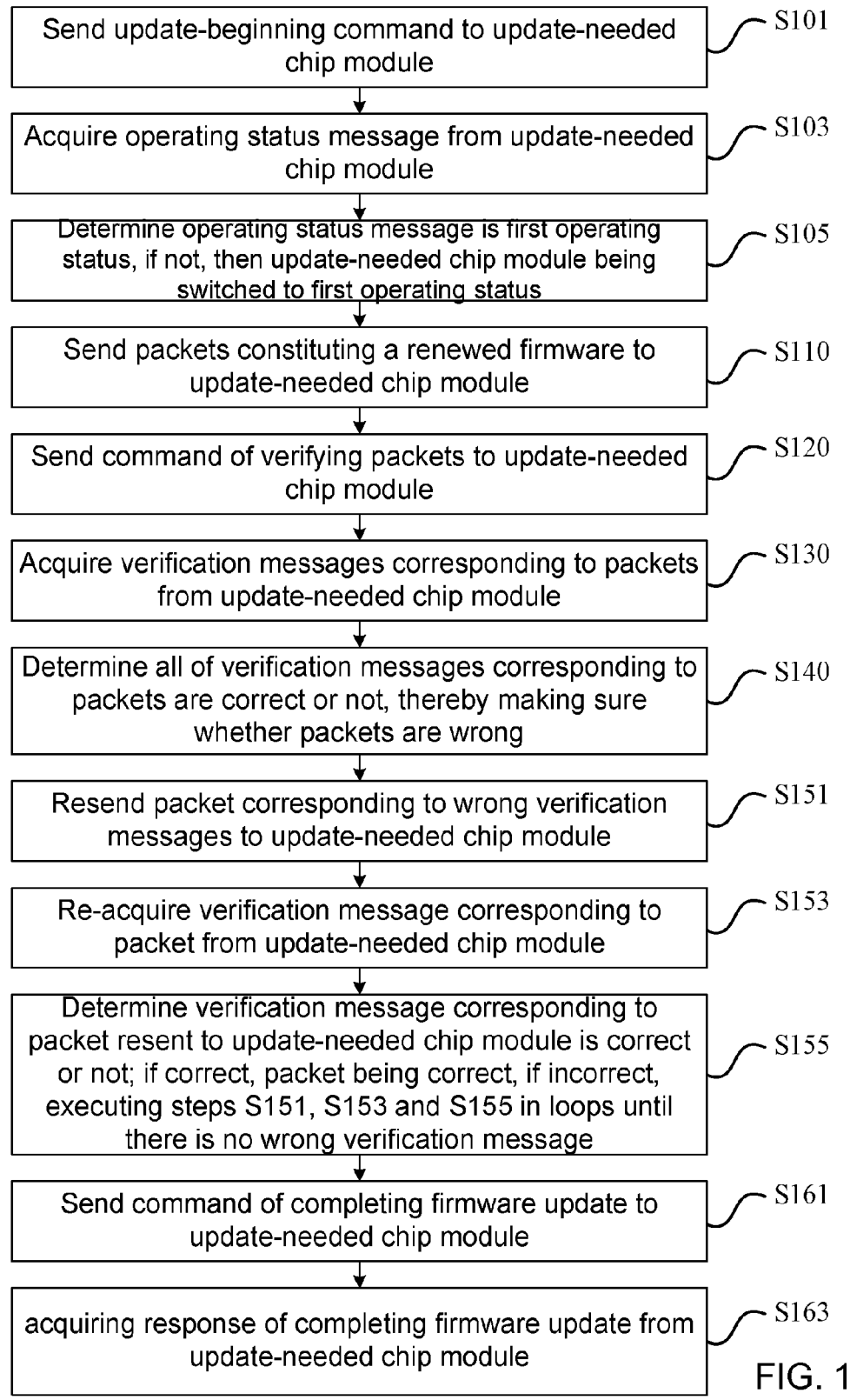
FIG. 1 is a flow chart illustrating specific steps of a method for updating a firmware of a rackmount server system according to one preferred embodiment of the present invention.

FIG. 1 is a flow chart illustrating specific steps of a method for updating a firmware of a sacrament server system according to one preferred embodiment of the present invention. Referring to FIG. 1, the present invention provides a method for updating firmware of a sacrament server system, suited to update a firmware of an update-needed chip module by a control chip module. In the embodiment, the control chip module is a rack management controller (referred to as RMC) of a rackmount server system, which is utilized to perform a firmware update for the chip having the firmware of the update-needed chip module. The rackmount server system includes at least one server coupled to the rack management controller, and the at least one server includes the update-needed chip module. The rack management controller is capable of controlling a start-up and a shutdown of the at least one server. The rack management controller has an ARM series chip (e.g., ARM9 chip) and runs on an embedded Linux system, but the scope of the claimed invention is not restricted thereby. In other embodiments, the control chip module also can be a baseboard management controller of a server. The baseboard management controller is capable of controlling a start-up and a shutdown of a server. The server includes the update-needed chip module. Moreover, the update-needed chip module is a chip having a firmware, and the chip having the firmware is disposed on a motherboard of a server. The update-needed chip module can be a control chip for controlling a fan speed, a chip for computing power consumption, and so on. The rack management controller decomposes the obtained firmware, which is provided for the update, into a plurality of packets, which is subsequently to be sent to update-needed nodes.

The method of the present invention for updating the firmware of the rackmount server system includes the steps of: step S101, sending an update-beginning command to the update-needed chip module by the control chip module; step S103, acquiring an operating status message from the update-needed chip module by the control chip module; step S105, determining whether the operating status message is a first operating status by the control chip module. If not, then the update-needed chip module is switched to the first operating status; step S110, sending a plurality of packets constituting a renewed firmware to the update-needed chip module by the control chip module; step S120, sending a command of verifying the packets to the update-needed chip module by the control chip module; step S130, acquiring a plurality of verification messages corresponding to the packets from the update-needed chip module by the control chip module; step S140, determining whether all of the verification messages corresponding to the packets are correct or not by the control chip module, thereby making sure whether the packets received by the update-needed chip module are incorrect or not; step S151, resending the packet corresponding to the incorrect verification messages to the update-needed chip module by the control chip module; step S153, re-acquiring the verification message corresponding to the packet, which is resent to the update-needed chip module, from the update-needed chip module by the control chip module; step S155, determining whether the verification message corresponding to the packet, which is resent to the update-needed chip module, is correct or not by the control chip module; if correct, the packet which is resent to the update-needed chip module by the control chip module is correct, if incorrect, executing steps S151, S153 and S155 in loops until there are no incorrect verification messages in the verification messages acquired by the control chip module from the update-needed chip module; step S161, sending a command of completing the firmware update to the update-needed chip module by the control chip module; and step S163, acquiring a response of completing the firmware update from the update-needed chip module by the control chip module, in which the update-needed chip module has been marked as being in a firmware update success state.

The following will explain the above-mentioned steps in detail.

In step S101, the control chip module sends an update-beginning command to the update-needed chip module, thereby attempting to establish a physical connection with the update-needed chip module. The update-needed chip module herein is a chip having a firmware, and the chip having the firmware is disposed on a motherboard of a server. The update-beginning command includes messages of a first address of a firmware updating application program, the size of each packet, the number of the packets, and so on. After sending the update-beginning command, it is an indication of readying to update the firmware and waiting for the response of the update-needed chip module.

In step S103, after the update-needed chip module receives the update-beginning command, the control chip module waits to receive an operating status message returning from the update-needed chip module. The operating status means a current operating status of the motherboard on which the chip of the update-needed chip module is disposed. The status includes a bootcode operating status and a runtime operating status. The bootcode operating status is used for the firmware updating operation, and the runtime operating status is used for a normal operation of the motherboard.

In step S105, subsequently, the control chip module determines whether the operating status message is a first operating status (i.e., the status to be able to update the firmware, such as the bootcode operating status). If the current operating status of the motherboard on which the chip of the update-needed chip module is disposed is the runtime operating status, then it is automatically switched to the bootcode operating status, so as to prepare for the subsequent firmware update. That is, the firmware update can be carried out in the bootcode operating status, and the firmware update cannot be carried out in the runtime operating status. It should be noted that if the control chip module determines whether a waiting time of the reception exceeds a predetermined first time threshold value, an update-beginning command is resent to the update-needed chip module by the control chip module, and recording a number of the update-beginning command which are sent. Furthermore, the control chip module determines whether the number of the update-beginning command which are sent is greater than a predetermined maximum resending number, if so, then the firmware update is stopped$_{[JH1]}$. In order to ensure the efficiency of the firmware update, in the embodiment of the present invention, there is a maximum number of the resending; for example, three times. If the number of times which the update-beginning command is resent is more than three, the physical connection is no longer established, that is, the firmware updating operation stops. Steps S101~S105 are alternative steps, which are utilized to make the control chip module attempt to establish the physical connection with the update-needed chip module. Owing to the impact of environmental factors (e.g. the network environment), there is no guarantee that the control chip module can establish the physical connection with the update-needed chip module for the first time. Thus, the control chip module is allowed to attempt to repeatedly establish a physical connection with the update-needed chip module.

In step S110, the control chip module sends a plurality of packets constituting a renewed firmware to the update-needed chip module, and starts to continuously send the plurality of packets constituting the renewed firmware to the update-needed chip module until the packets are sent completely. Before the step of sending a plurality of packets constituting a renewed firmware to the update-needed chip module by the control chip module, the method further includes resolving the renewed firmware into the packets by the control chip module. When the update-needed chip module (e.g., the firmware of the embedded chips on a certain motherboard of the rackmount server system) needs to be updated, the control chip module first reads the renewed firmware, and afterwards splits the renewed firmware into a plurality of packets to be sent to the update-needed chip module. In the embodiment of the present invention, the control chip module will send a command (for example, SET FW IMAGE command) of updating the firmware to the update-needed chip module, and start to continuously send the plurality of packets (i.e., bootcodes of the chip waiting for the firmware update) constituting the renewed firmware to the update-needed chip module until the packets are sent completely, in order to ensure that the packets of the renewed firmware can be transmitted quickly and reliably.

In step S120, the control chip module sends a command of verifying the packets to the update-needed chip module, thereby verifying whether the packets received by the update-needed chip module are correct (since the packets during transmission may be wrong). When the renewed firmware which is split into the plurality of packets is transmitted, the transmitted packets need to be verified in a Cyclic Redundancy Check (CRC) for ensuring integrity and reliability of the transmitted renewed firmware. In the embodiment of the present invention, the control chip module sends a command (for example, a CHECK FW IMAGE command) of verifying the packets to the update-needed chip module for obtaining a plurality of verification messages of the packets. Meanwhile, after study, the reason for the slow and time-consuming firmware update in the prior art is that, in the conventional method for updating firmware of a rackmount server system, every time the control chip module sends a packet to the update-needed chip module, it will wait for the update-needed chip module (i.e., the chip disposed in the update-needed chip module) to reply a CRC message of the single sent packet. Then the control chip module checks whether the CRC message of the single sent packet is correct or not; only if the packet is correct will it send the next packet in turn. If incorrect, then it will resend the single packet. Since the control chip module needs to wait for the response of the update-needed chip module after sending each packet, there will be a long wait if there are more packets (i.e., the renewed firmware is larger), thus causing the slow and time-consuming firmware update in the prior art. In the embodiment of the present invention, the control chip module will no longer wait for the response of the update-needed chip module after sending each packet but continuously and uninterruptedly sends all packets, and then check a plurality of CRC messages (all CRC including correct and error messages) of the packets.

In step S130, the control chip module receives the plurality of verification messages of the packets returning from the update-needed chip module.

In step S140, the control chip module determines whether all of the verification messages corresponding to the packets are correct or not. If one of the verification messages is incorrect, then the corresponding packet has an error. If incorrect, the control chip module will further send a command (for example, a RE-SET FW IMAGE command) for re-updating the firmware to the update-needed chip module, and resend the wrong packet to the update-needed chip module. This specific step is as follows.

After step S140, the method further includes: step S151, resending the wrong packets corresponding to all of the wrong verification messages to the update-needed chip module by the control chip module; step S153, re-acquiring the verification message corresponding to the packet, which is resent to the update-needed chip module, from the update-needed chip module by the control chip module; step S155, determining whether the verification message corresponding to the packet, which is resent to the update-needed chip module, is correct or not by the control chip module; if correct, the packet which is resent to the update-needed chip module by the control chip module is correct, if incorrect, executing steps S151, S153 and S155 in loops until there are no wrong verification messages in the verification messages acquired by the control chip module from the update-needed chip module (i.e., all of the plurality of verification messages are correct).

By means of executing steps S151, S153 and S155 in loops, it can be ensured that all of the packets are correct. That is, the renewed firmware obtained by the chip is correct. Moreover, in the process of resending all of the wrong packets, the number of the resent packets is a maximum number of the current wrong packets, and then the execution waits for one response. For example, a total number of wrong packets are three. Then all of the three wrong packets are sent once, and the execution waits for one response. In the prior art, the number of the resent packets is an accumulated value of the current wrong packets, and then the execution waits for one response. For example, the total number of wrong packets is three. Then, first, the first wrong packet is resent, and the execution waits for one response. Secondly, the second wrong packet is resent, and the execution waits for one response. Thirdly, the third wrong packet is resent, and the execution waits for one response. Therefore, the present invention can effectively solve the step of tediously awaiting the response of the update-needed chip module, thereby saving a lot of time and enhancing the speed of the firmware update.

After step S155, the method may further include: step S161, sending a command of completing the firmware update to the update-needed chip module by the control chip module; step S163, acquiring a response of completing the firmware update from the update-needed chip module by the control chip module, in which the update-needed chip module has been marked as being in a firmware update success state.

After all of the verification messages of the packets are correct, the control chip module sends a command (for example, a COMPLETE command) of completing the firmware update to the update-needed chip module. After the update-needed chip module receives the command of completing the firmware update, an identity (for instance, flag=1 means the firmware update is successful, also, the identity is used for the switch between the bootcode/runtime operating statuses. Hence, the identity can also be referred to as a switch modes identity) of the firmware is updated, and an application program of the firmware update is performed, and then a response of completing the firmware update returns to the control chip module. In performing the application program of the firmware update, two preferred ways are provided. One way is that the chip in the update-needed chip module first collects all of the packets in a dynamic random access memory (i.e., RAM), and then writes into a read-only memory (i.e., ROM), so as to update the firmware. Another way is that the chip collects the packets in the RAM, as writes them into the ROM, thereby completing the firmware updating operation. After the control chip module receives the response of completing the firmware update from the update-needed chip module, the firmware has been updated completely. It should be noted that, after the motherboard of the chip disposed in the update-needed chip module restarts, the identity of the firmware will be checked automatically. If flag=1 is found, it will automatically switch to the runtime operating status.

An embodiment will be provided below in conjunction with FIG. 2 and FIG. 3 to further illustrate the method of the present invention for updating the firmware of the rackmount server system and the prior art method for updating the firmware of the rackmount server system.

Figure 2:
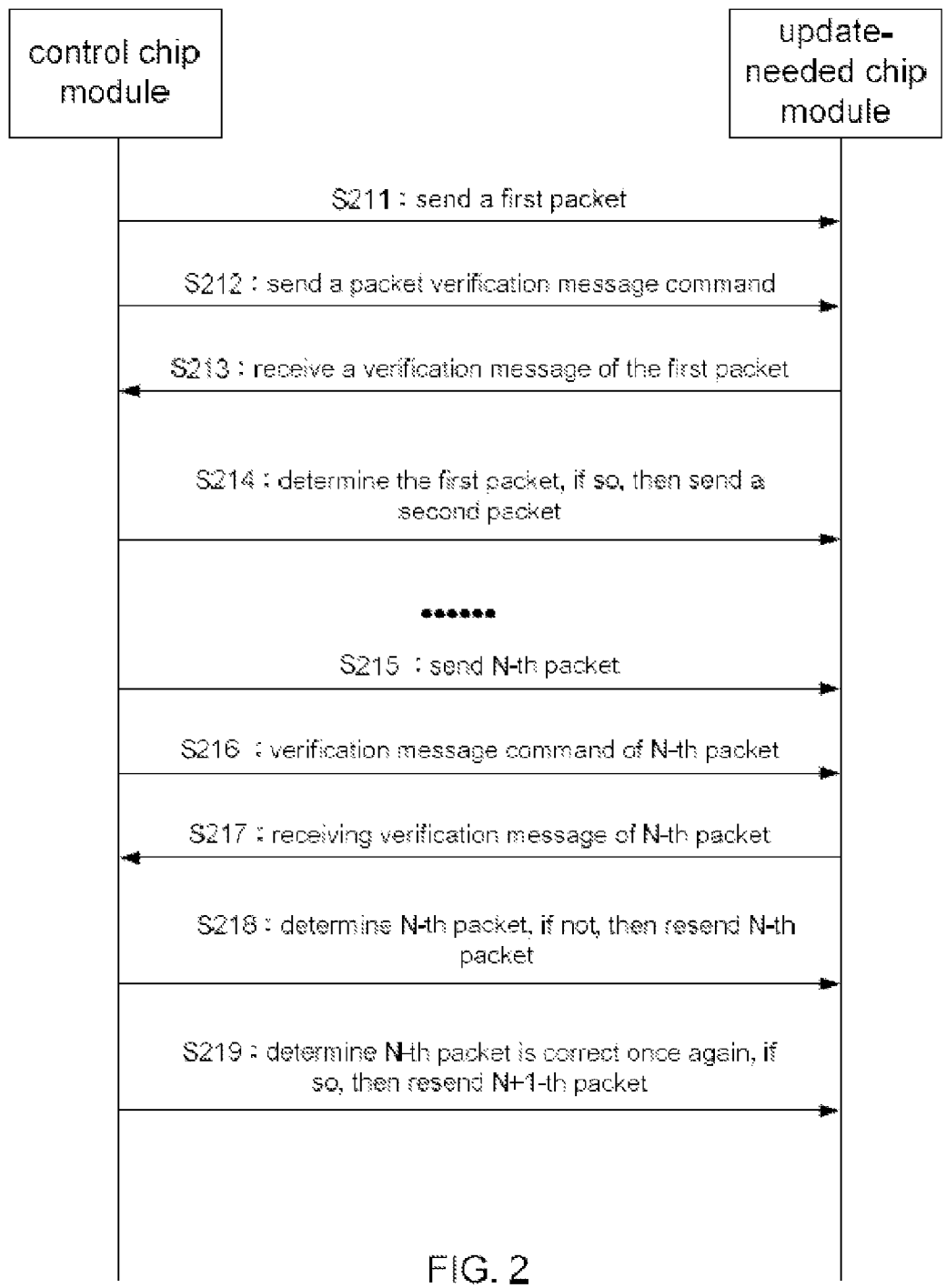
FIG. 2 is a schematic drawing illustrating message interaction of a conventional method for updating a firmware of a rackmount server system.
Figure 3:
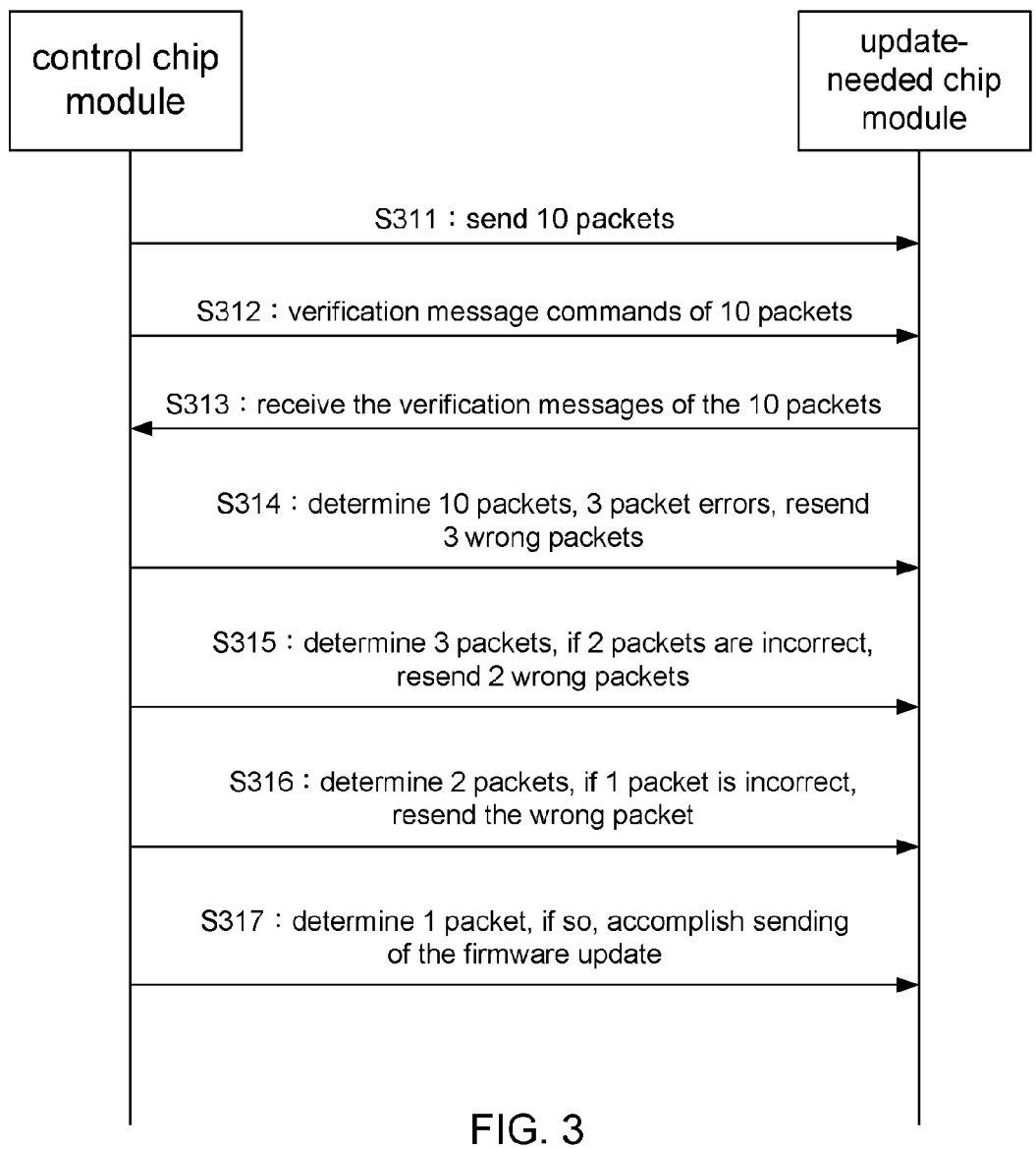
FIG. 3 is a schematic drawing illustrating message interaction of the method for updating a firmware of a rackmount server system according to the present invention.

FIG. 2 is a schematic drawing illustrating message interaction of a conventional method for updating a firmware of a rackmount server system. FIG. 3 is a schematic drawing illustrating message interaction of the method for updating a firmware of a rackmount server system according to the present invention.

Referring to FIG. 2, suppose that sending a packet needs one second, and awaiting a response needs one second for sending a total of 10 packets.

Step S211: sending a first packet to the update-needed chip module by a packet control chip module.

Step S212: sending a packet verification message command to the update-needed chip module by a packet control chip module.

Step S213: receiving a verification message of the first packet by the control chip module.

Step S214: determining whether the verification message is correct or not by the control chip module, if so, then sending a second packet.

Step S215: sending an N-th packet to the update-needed chip module by a packet control chip module, in which N is less than 10.

Step S216: sending the verification message command of the N-th packet to the update-needed chip module by a packet control chip module.

Step S217: receiving the verification message of the N-th packet by the control chip module.

Step S218: determining whether the verification message of the N-th packet is correct or not by the control chip module, if not, then resending the N-th packet.

Step S219: determining whether the verification message of the N-th packet is correct or not once again by the control chip module, if so, then resending the N+1-th packet.

Therefore, from the foregoing steps, it can be seen that in sending the 10 packets, if there is no packet error, it takes about 20 seconds. When there is a packet error, it takes about 20 seconds+1 second+1 second (i.e. 22 seconds). When there are two packet errors, it takes about 20 seconds+2 seconds+2 seconds (i.e. 24 seconds). When there are three packet errors, it takes about 20 seconds+3 seconds+3 seconds (i.e. 26 seconds). When there are N packet errors, it takes about 20 seconds+N seconds+N seconds (i.e. 20+2N seconds).

Subsequently, referring to FIG. 3, it is supposed that sending 10 packets in sequence needs one second, and waiting for the response needs one second, for sending a total of 10 packets.

Step S311: sending 10 packets to the update-needed chip module by a packet control chip module.

Step S312: sending the verification message commands of the 10 packets to the update-needed chip module by a packet control chip module.

Step S313: receiving the verification messages of the 10 packets by the control chip module.

Step S314: determining whether the verification messages of the 10 packets are correct by the control chip module. If three packet errors are found, the three wrong packets will be resent firstly.

Step S315: determining whether the verification messages of the three wrong packets are correct once again by the control chip module. If so, then the sending of the firmware update has been completed. If two incorrect packet verification messages are still found, the two wrong packets will be resent secondly.

Step S316: determining whether the verification messages of the two wrong packets are correct once again by the control chip module. If so, then the sending of the firmware update has been accomplished. If one incorrect packet verification message is still found, the wrong packet will be resent secondly.

Step S317: determining whether the verification message of the wrong packet is correct once again by the control chip module. If so, then the sending of the firmware update has been accomplished.

Therefore, from the foregoing steps, it can be seen that it takes about 2 seconds if there is no packet error in sending the 10 packets (Assuming that the time to send a packet is equivalent to the time to send 10 packets. In actual operation, in view of its data size of the packet and the network environment, the time to send 10 packets should be slightly longer than the time to send 1 packet). When a packet error occurs 1 time, it takes about 2 seconds+1 second+1 second (i.e. 4 seconds). When a packet error occurs 2 times, it takes about 4 seconds+1 second+1 second (i.e. 6 seconds). When a packet error occurs 3 times, it takes about 6 seconds+1 second+1 second (i.e. 8 seconds). When a packet error occurs N times, it takes about 2N seconds+1 second+1 second (i.e. 2N+2 seconds).

Therefore, it can be seen from the foregoing that in the process of resending all of the wrong packets according to the present invention, the number of the resent packets is a maximum number of the current wrong packets, and then the execution waits for one response. In the prior art, the number of the resent packets is an accumulated value of the current wrong packets, and then the execution waits for one response. Consequently, the present invention can effectively solve the step of tediously awaiting the response of the update-needed chip module, thereby saving a lot of time and enhancing the speed of the firmware update.

Figure 4:
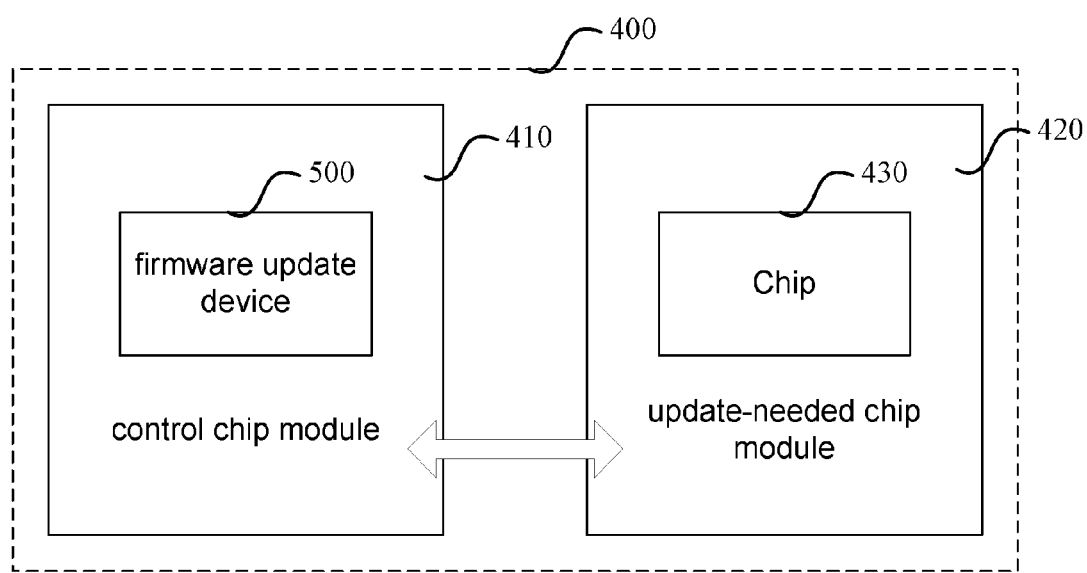
FIG. 4 is a block diagram illustrating the server where a firmware update device located according to the preferred embodiment of the present invention.

FIG. 4 is a block diagram illustrating the server where a firmware update device is located according to the preferred embodiment of the present invention. The firmware update device 500 as shown in FIG. 4 according to the preferred embodiment of the present invention is suited to update a firmware of an update-needed chip module 420 by a control chip module 410. In the embodiment, the control chip module 410 is a rack management controller of a rackmount server system 400, in order to perform a firmware update for the chip 430 having the firmware of the update-needed chip module 420. The rackmount server system 400 includes at least one server (not shown in the drawing) coupled to the rack management controller, and the at least one server includes the update-needed chip module 420. The rack management controller is capable of controlling a start-up and a shutdown of the at least one server. The rack management controller has an ARM series chip and runs on an embedded Linux system, but the claims of the present invention are not restricted thereby. In other embodiments, the control chip module 410 can also be a baseboard management controller of a server (not shown in the drawing). The baseboard management controller is capable of controlling a start-up and a shutdown of the server. The server includes the update-needed chip module 420. Moreover, the update-needed chip module 420 is a chip 430 having a firmware, and the chip 430 having the firmware is disposed on a motherboard (not shown in the drawing) of a server.

Figure 5:
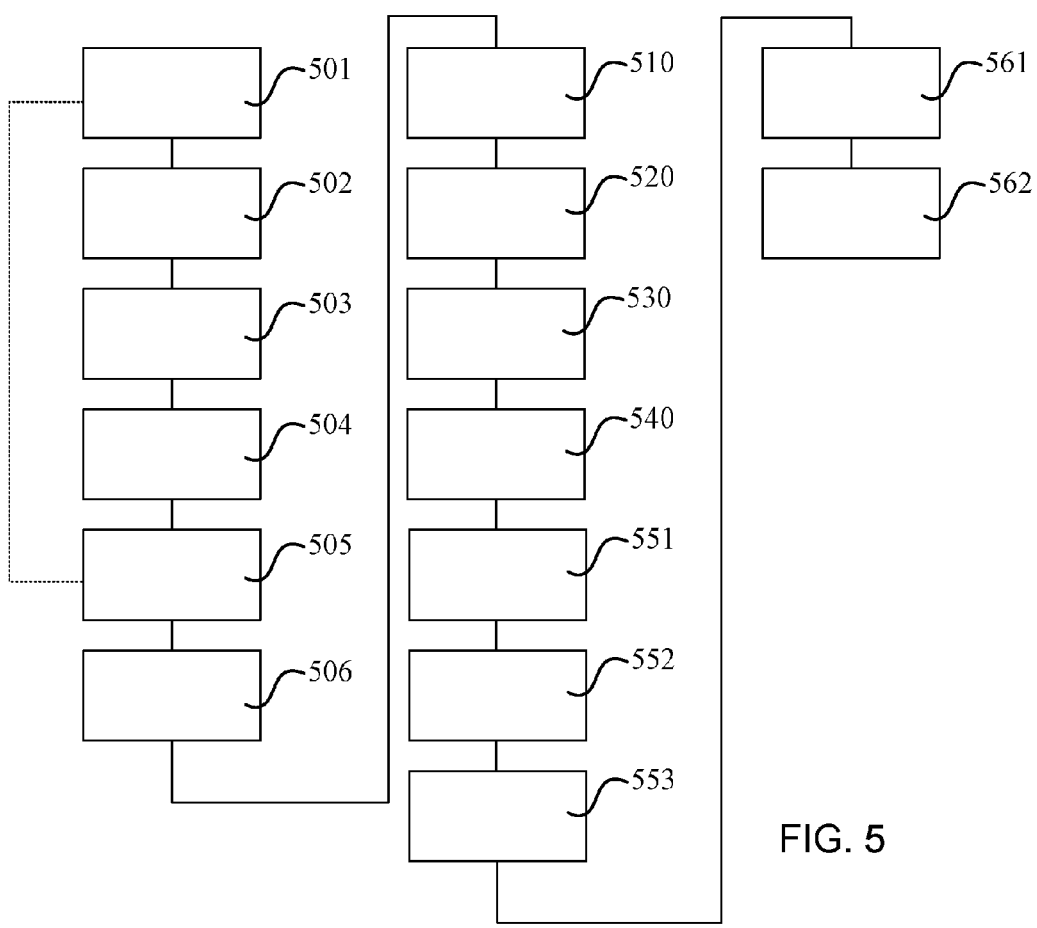
FIG. 5 is a block diagram illustrating the firmware update device according to the preferred embodiment of the present invention.

FIG. 5 is a block diagram illustrating the firmware update device according to the preferred embodiment of the present invention. Referring to FIG. 4 and FIG. 5, the firmware update device 500 includes a packet sending module 510, a verification message request module 520, a verification message capture module 530, and a verification message determining module 540. In one embodiment of the present invention, the firmware update device 500 can be disposed in the control chip module, and utilized to perform the firmware update for at least one chip of at least one motherboard in a the rackmount server system. In other embodiments, the firmware update device 500 can also be disposed in other devices within the rackmount server system, and is utilized to perform the firmware update for at least one chip of at least one motherboard. Certainly, the firmware update device 500 may also be an individual unit.

Furthermore, the packet sending module 510 is utilized to send a plurality of packets constituting a renewed firmware to the update-needed chip module 420 by the control chip module 410. In one embodiment of the present invention, the updating firmware device 500 will send a command of updating the firmware to the update-needed chip module 420 first, and then continuously send the plurality of packets constituting the renewed firmware to the update-needed chip module 420. A bandwidth of a transmission channel between the control chip module 410 and the update-needed chip module 420 is limited, and the amount of transmission data has a limitation. Therefore, the renewed firmware has to be split into a plurality of packets and then the packets are sent until all of the packets are sent.

The verification message request module 520, which is coupled to the packet sending module 510, is utilized to send a command of verifying the packets to the update-needed chip module 420 by the control chip module 410. Since the renewed firmware which is split into the plurality of packets is transmitted, the transmitted packets need to be verified in the CRC for ensuring the integrity and reliability of the transmitted renewed firmware.

The verification message capture module 530, which is coupled to the verification message request module 520, is utilized to acquire a plurality of verification messages corresponding to the packets from the update-needed chip module 420 by the control chip module 410.

The verification message determining module 540, which is coupled to the verification message capture module 530, is utilized to determine whether all of the verification messages corresponding to the packets are correct or not by the control chip module 410, thereby determining whether the packets received by the update-needed chip module 420 are wrong or not.

The firmware update device further includes: a packet resending module 551, a verification message recapture module 552, and a verification message predetermining module 553. The packet resending module 551, which is coupled to the verification message determining module 540, is utilized to resend the packet corresponding to the wrong verification messages to the update-needed chip module 420 by the control chip module 410 if one of the verification messages is incorrect. That is, after the control chip module 410 acquires the verification messages of the packets, if an error is found in the verification messages of the packets, the firmware update device 500 will resend all of the wrong packets to the update-needed chip module 420 at the same time. The verification message recapture module 552, which is coupled to the packet resending module 551, is utilized to re-acquire the verification message corresponding to the packet, which is resent to the update-needed chip module 420, from the update-needed chip module 420 by the control chip module 410. The verification message predetermining module 553, which is coupled to the verification message recapture module 552, is utilized to determine whether the verification message corresponding to the packet, which is resent to the update-needed chip module 420, is correct or not by the control chip module 410, and when the verification message is incorrect, to call the packet resent module. That is, in the process of resending all the wrong packets, if the verification messages of the packets herein still have an error then all of the wrong packets are resent the update-needed chip module 420 continuously, until all of the packets are verified to be correct.

In the process of resending all of the wrong packets, the number of the resent packets is a maximum number of the current wrong packets, and then the execution waits for one response. Whereas in the prior art, the number of the resent packets is an accumulated value of the current wrong packets, and then the execution waits for one response. Therefore, the present invention can effectively solve the problem of tediously awaiting the response, thereby saving a lot of time and enhancing the speed of the firmware update.

In accordance with one preferred embodiment of the present invention, the firmware update device 500 may further include: an update-beginning command sending module 501, an operating status capture module 505, and an operating status determining module 506. The update-beginning command sending module 501, the operating status capture module 505, and the operating status determining module 506 are alternative components.

The update-beginning command sending module 501 herein is utilized to send an update-beginning command to the update-needed chip module 420 by the control chip module 410. By sending the update-beginning command, it seeks to establish a physical connection with the update-needed chip module 420. Meanwhile, the update-beginning command includes messages of a first address of a firmware updating application program, the size of each packet, the number of the packets, and so on. After sending the update-beginning command, it is a sign of readying to update the firmware and waiting for the response of the update-needed chip module.

The operating status capture module 505 is utilized to acquire an operating status message from the update-needed chip module 420 by the control chip module 410. In the embodiment of the present invention, the operating status capture module 505 is coupled to a resending number determining module 504 (detailed in the following). In other embodiments, the operating status capture module 505 can be directly coupled to the update-beginning command sending module 501 (shown as the dotted line in FIG. 5). The operating status determining module 506, which is coupled to the operating status capture module 505, is utilized to determine whether the operating status message is a first operating status by the control chip module 410, if not, then the update-needed chip module 420 is switched to the first operating status.

The firmware update device 500 may further include the following alternative components: a waiting receipt module 502, an update-beginning command resending module 503, and a resending number determining module 504.

The waiting receipt module 502, which is coupled to the update-beginning command sending module 501, is utilized to wait to receive an operating status message from the update-needed chip module 420 by the control chip module 410. After the update-needed chip module 420 receives the update-beginning command, the update-needed chip module 420 returns a current operating status of the motherboard on which the chip of the update-needed chip module is disposed. The status includes a bootcode operating status and a runtime operating status. The bootcode operating status is used for the firmware updating operation, and the runtime operating status used for a normal operation of the motherboard. The control chip module determines whether the operating status message is a predetermined first operating status (i.e., the bootcode operating status). If the current operating status of the motherboard on which the chip of the update-needed chip module 420 is disposed is the runtime operating status, then it is automatically switched to the bootcode operating status, so as to prepare for the subsequent firmware update.

The update-beginning command resending module 503, which is coupled to the waiting receipt module 502, is utilized to make the control chip 410 to resend an update-beginning command to the update-needed chip module 420, and record a number of the update-beginning command which are sent if a waiting time of the reception exceeds a predetermined first time threshold value.

The resending number determining module 504, which is coupled to the update-beginning command resending module 503, is utilized to determine whether the number of the update-beginning command which are sent is greater than a predetermined maximum resending number by the control chip module 410. If so, then the firmware update is stopped. The updating firmware device 500 attempts to establish a physical connection with the update-needed chip module 420. Due to the impact of environmental factors (e.g. the network environment), there is no guarantee that the firmware update device 500 can establish the physical connection with the update-needed chip module 420 for the first time. Thus, the firmware update device 500 is allowed to attempt to repeatedly establish the physical connection with the update-needed chip module 420. In order to ensure the efficiency of the firmware update, there is a maximum number of the resending, for example, three times. If the number of times which the update-beginning command is resent is more than three times, the physical connection is no longer established, that is, stops the firmware updating operation.

The firmware update device 500 may further include the following alternative components: a completing update request module 561 and a completing update response module 562. The completing update request module 561 is utilized to send a command of completing the firmware update to the update-needed chip module 420 by the control chip module 410.

The completing update response module 562, which is coupled to the completing update request module 561, is utilized to acquire a response of completing the firmware update from the update-needed chip module 420 by the control chip module 410, in which the update-needed chip module 420 has been marked as a firmware update success state. That is, After the chip disposed in the update-needed chip module 420 receives the command of completing the firmware update, the chip will update the identity (for example, flag=1 means the firmware update is successful, also the identity is used for the switch between the bootcode/runtime operating statuses. Hence, the identity can also be referred to as a switch modes identity.) of the firmware, and the application program of the firmware update is carried out, and then a response of completing the firmware update returns to the control chip module 410.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. A method for updating firmware of a rackmount server system, suited to update a firmware of an update-needed chip module by a control chip module, the control chip module being a rack management controller of the rackmount server system, the rackmount server system comprising at least one server coupled to the rack management controller, the at least one server comprising the update-needed chip module, the rack management controller being capable of controlling a start-up and a shutdown of the at least one server, the method comprising the steps of:

sending a plurality of packets constituting a renewed firmware to the update-needed chip module by the control chip module;

sending a command of verifying the packets to the update-needed chip module by the control chip module;

acquiring a plurality of verification messages corresponding to the packets from the update-needed chip module by the control chip module; and determining whether all of the verification messages corresponding to the packets are correct or not by the control chip module, thereby making sure whether the packets received by the update-needed chip module are wrong or not;

wherein before the step of sending a plurality of packets constituting a renewed firmware to the update-needed chip module by the control chip module, the method further comprises:

sending an update-beginning command to the update-needed chip module by the control chip module;

acquiring an operating status message from the update-needed chip module by the control chip module; and determining whether the operating status message is a first operating status by the control chip module, if not, then the update-needed chip module being switched to the first operating status; and wherein after the step of sending the update-beginning command to the update-needed chip module by the control chip module, the method further comprises:

waiting to receive an operating status message from the update-needed chip module by the control chip module; and if a waiting time of the reception exceeds a predetermined first time threshold value, resending an update-beginning command to the update-needed chip module by the control chip module, and recording a number of the update-beginning command which are sent.

2. The method of claim 1, wherein the step of determining whether all of the verification messages corresponding to the packets are correct or not by the control chip module comprises: if one of the verification messages is incorrect, further comprising the following steps:

step a, resending the packet corresponding to the wrong verification messages to the update-needed chip module by the control chip module;

step b, re-acquiring the verification message corresponding to the packet, which is resent to the update-needed chip module, from the update-needed chip module by the control chip module; and step c, determining whether the verification message corresponding to the packet, which is resent to the update-needed chip module, is correct or not by the control chip module;

if correct, the packet which is resent to the update-needed chip module by the control chip module being correct, if incorrect, executing steps a, b, and c in loops until there is no incorrect verification message in the verification messages acquired by the control chip module from the update-needed chip module.

3. The method of claim 1, wherein before the step of sending a plurality of packets constituting a renewed firmware to the update-needed chip module by the control chip module, the method further comprises resolving the renewed firmware into the packets by the control chip module.

4. The method of claim 1, wherein the step of determining whether all of the verification messages corresponding to the packets are correct or not by the control chip module comprises: if the verification messages are correct, each of the packets received by the update-needed chip module is correct.

5. The method of claim 1, wherein the update-needed chip module is a chip having a firmware, and the chip having the firmware is disposed on a motherboard of a server.

6. The method of claim 1, wherein after the step of resending an update-beginning command to the update-needed chip module by the control chip module, and recording a number of the update-beginning command which are sent, the method further comprises:

determining whether the number of the update-beginning command which are sent is greater than a predetermined maximum resending number by the control chip module;

if so, then stopping the firmware update.

7. The method of claim 2, wherein after the step of no wrong verification messages in the verification messages acquired by the control chip module from the update-needed chip module, the method further comprises:

sending a command of completing the firmware update to the update-needed chip module by the control chip module; and acquiring a response of completing the firmware update from the update-needed chip module by the control chip module, wherein the update-needed chip module has been marked as a firmware update success state.

* * * * *